March 6, 1951 L. E. VARDEN 2,544,196
PHOTOELECTRIC COLOR ANALYZER
Filed Aug. 4, 1947 2 Sheets-Sheet 1
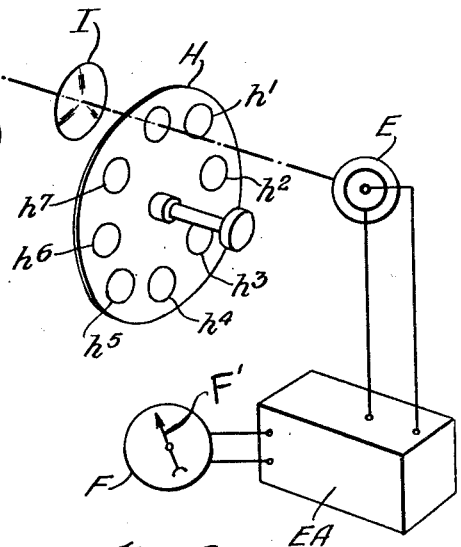
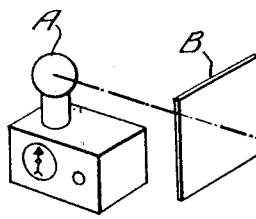
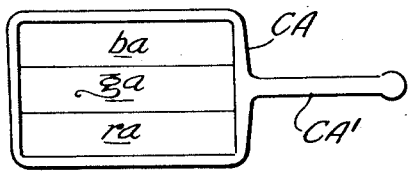
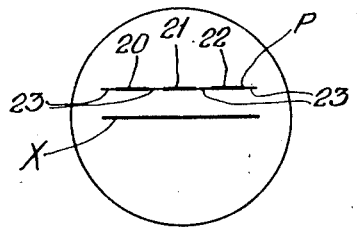
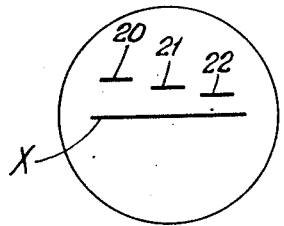
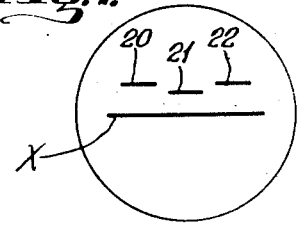
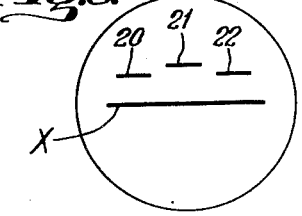
INVENTOR
LLOYD E. VARDEN
BY
John E. Hubbell
ATTORNEY March 6, 1951 L. E. VARDEN 2,544,196
PHOTOELECTRIC COLOR ANALYZER
Filed Aug. 4, 1947 2 Sheets-Sheet 2
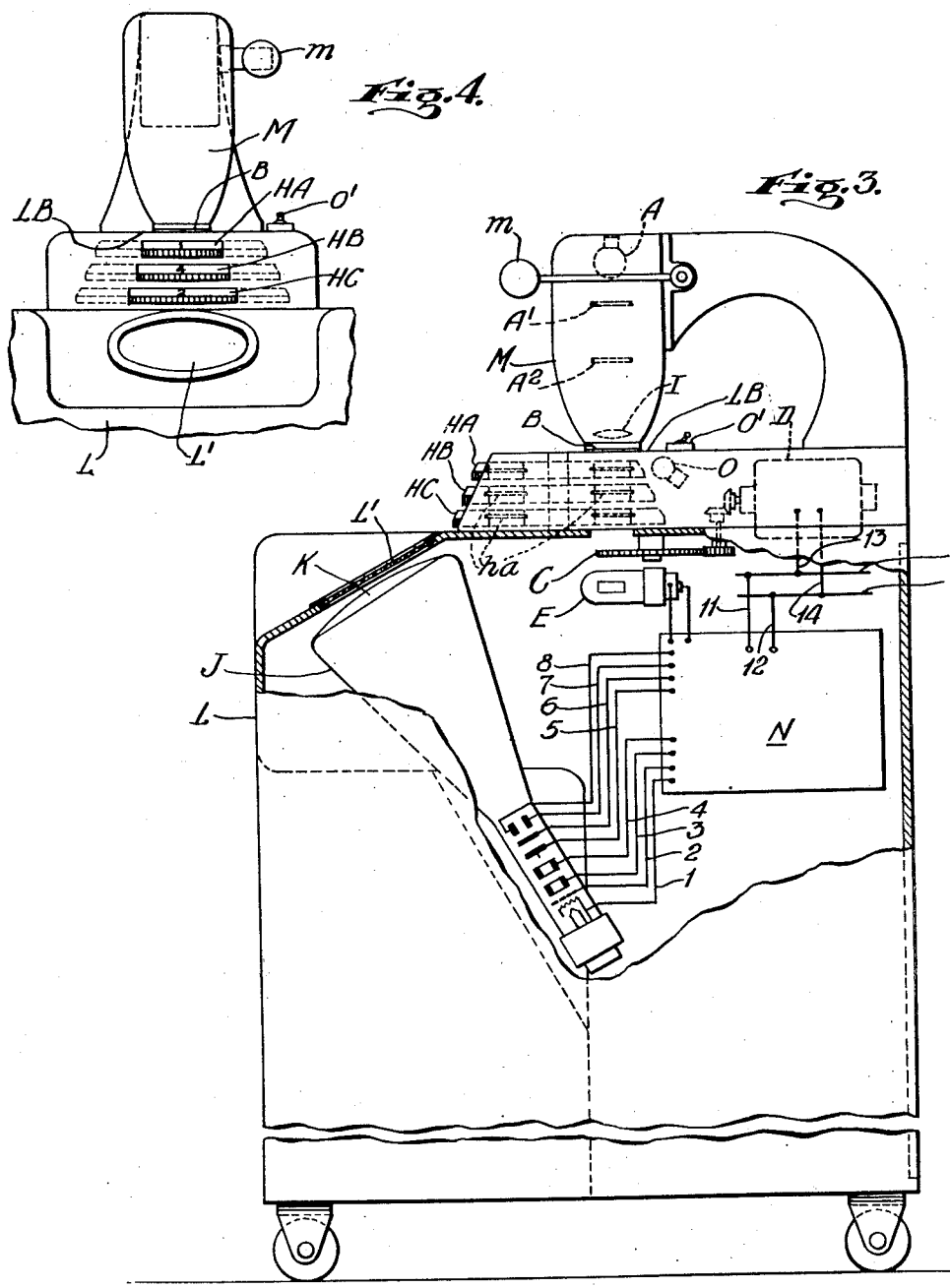
INVENTOR
LLOYD E. VARDEN
BY
John E. Hubbell
ATTORNEY Patented Mar. 6, 1951

2,544,196

UNITED STATES PATENT OFFICE 2,544,196

PHOTOELECTRIC COLOR ANALYZER

Lloyd E. Varden, New York, N. Y., assignor to Pavelle Color Incorporated, New York, N. Y., a corporation of Delaware Application August 4, 1947, Serial No. 765,823

6 Claims. (Cl. 88—14)

The general object of the present invention is to provide a simple and effective method of and apparatus for analyzing the color balance condition of photographic material on which a color negative is produced by a non-reversal process, and from which a positive color print may be produced photographically on monopack color material by a non-reversal process. Ordinarily, the photographic material on which a color negative is so produced is a film strip having a multilayer emulsion for use in roll film cameras. In practice, such film strips vary in length and hence in the number of color negatives which can be made on an individual strip. Usually that number is not less than 6, nor greater than 24. Such photographic material will herein ordinarily be referred to as a color negative film, although it is possible to use the present invention in analyzing the color condition of photographic material which is not in film strip form.

The primary purpose of the color negative film analysis made by the use of the present invention is to determine what color correction, if any, is needed to obtain optimum results in making color positives from a negative made on a color negative film. Such color correction is ordinarily needed when the color condition of the negative film strip is off-balance, so that the processing of the color negative film to produce a so-called "gray patch," will not result in a patch having a standard gray value. That standard value may be a so-called "neutral" gray, or in some cases it may depart in a predetermined manner from the neutral gray. A well known procedure for the production of a gray patch on a color negative film involves the exposure of a small end portion of the film to a controlled white light exposure. When the film after its exposure is subjected to a non-reversal process the latent negative images which have been formed on the film by the exposures of successive sections of the body portion of the film are converted into color negatives, and a gray patch is formed on the end portion of the film. Such a gray patch film portion will transmit substantially the same amounts of blue, green and red components of white printing light, provided the color negative film is in color balance. If said film is "off-balance," the gray patch portion of the film will transmit more light of one than of another of the blue, green and red components of the printing light. The off-balance color condition of a color negative film is ordinarily due either to a departure from the desired, or standard distribution of color forming material in the emulsion portion of the film, incorrect sensitivity of one or more emulsion layers, or to other well known causes, or to faulty processing of the exposed color negative film for the production of a color negative or negatives thereon. When the color negative film is off-balance, the gray patch will not have a neutral gray value but will have a color tinge of hue which may be yellowish, purplish, or of some other character depending on the nature of the off-balance condition of the color negative film.

A correct analysis of the off color-balance condition of the color negative film makes it possible to accurately determine what corrective or compensating steps should be taken to obtain optimum results in printing colored positives from a negative on the film. Those steps ordinarily involve the selection and use of a color filter or filters which are interposed in the path of the printing light, thus modifying the color of the printing light transmitted to the photographic material on which the color positive print is produced. In some cases the corrective steps may include or consist of a suitable modification in the color temperature of the printing light.

In one known practical method for producing color positive prints, which is alternative to the non-reversal method hereinbefore mentioned, the prints are formed by a reversal process treatment of the photographic material onto which images are projected from a transparency carrying a color positive produced by subjecting a latent negative to a reversal process. In a positive so produced, the deficiencies in the color reproduction of the original scene can be estimated by visual judgment, particularly when the scene consists of familiar objects, as is quite frequently the case.

Such a simple, straightforward visual method of analysis is extremely difficult to apply in determining the color off-balance condition of a color negative film produced by the non-reversal process. Heretofore, one means of analysis of the off-color balance condition of the color negative film has been visually effected by comparing the hue of the film gray patch against various standard and known off-gray samples until a match is obtained. In practice, however, this visual matching method of analysis is undesirably slow, and the results are not adequately accurate since they depend on the judgment of the operator who is liable to errors in judgment, even when well trained and careful.

A specific object of the present invention is to provide a method of determining the color balance condition of a color negative film substantially more rapidly, and with greater inherent accuracy, than is possible with said known "gray patch" matching method. In the practice of the present invention, use is made of a so-called "gray patch" which may be formed on an end of the color negative film in the manner heretofore customary. With the present invention, however, the use made of the gray patch is widely different from the use made of that patch in the matching or comparison method of using the spot heretofore known.

In accordance with the present invention, a beam of white light from a suitable source is transmitted through the gray patch of a color negative film undergoing analysis, to a photoelectric cell to thereby create a photoelectric cell current which is measured and provides a measure of the intensity of the light transmitted to the photocell. The beam of light passing through the gray patch of the film to the photocell is successively intercepted by different optical absorption filters, each of which transmits principally only one of the primary colors, blue, green and red, and absorbs light of a color complementary to that which it transmits. With absorption filters having the proper complementary light absorbing characteristics, each will absorb the proper fraction of the total amount of light passing through the gray patch toward the photoelectric cell when the color condition of the negative color film is not off-balance.

In consequence, the successive interception of the beam by the different filters will not vary the photocell current when the condition of the color negative film being analyzed is not off-balance. If the color condition of the film is off-balance, however, so that the different complementary color components of the light passing through the gray path are unequal, the successive interception of the light beam by the different filters will cause the photocell current to fluctuate.

In a preferred form of the invention, the light absorbing filters form sector portions of a filter disc which may be rotated manually or by a motor. Alternatively, the light absorbing filters may be manually moved into and out of the path of the light beam passing to the photo cell at regular or irregular intervals. The frequency with which the light beam is intercepted by the different filters is not critical, provided only that it is not too high to prevent the measuring apparatus from showing significant changes in the photocell current which may be produced by the successive interception of the different filters when the color negative film is off-balance.

In a preferred form of the invention, compensating filters separate from the light absorbing filters, are moved to successively intercept the beam of light passing to the photocell during periods in which the photocell current fluctuates, until the fluctuation is made to subside, as will occur when the characteristics of the compensating filter is such as to balance the spectral energy distribution of the light passing to the photocell from the last mentioned filter.

In a desirable practical form of the invention, a cathode ray oscilloscope is used to form a pattern on a fluorescent screen comprising portions representing the values of the light components of different colors transmitted through the gray patch sample to a photocell which impresses a signal voltage on the oscilloscope.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described a preferred embodiment of the invention.

Of the drawings:

Fig. 1 of the accompanying drawings diagrammatically illustrates one form of apparatus embodiment of the present invention well adapted for use in carrying out my novel method;

Fig. 2 is an elevation of a device for use in lieu of an optical filter device included in the apparatus shown in Fig. 1;

Fig. 3 is an elevation of a color balance indicator unit including an oscilloscope;

Fig. 4 is an elevation, taken at right angles to Fig. 3, of a portion of the apparatus shown in the last mentioned figure, and Figs. 5, 6, 7 and 8 are diagrams illustrating types of oscilloscope patterns which may be produced with apparatus shown in Figs. 3 and 5.

In the apparatus shown diagrammatically in Fig. 1, a tungsten lamp or other suitable source A of white light emits light which passes through the gray patch portion B of a color negative film to be analyzed. A light absorbing filter device C comprising sectors $b$, $g$ and $r$ adapted to selectively transmit blue, green and red light respectively, is so arranged that when rotated by a motor D the different segments $b$, $g$ and $r$ successively intercept the beam of light emitted from the light source A and passed through the transparency B to a light sensitive device D which is preferably a photoelectric cell of a commercially available type suitably sensitive to all wave lengths in the visible spectrum. As diagrammatically shown in Fig. 1, apparatus EA, which may be of conventional type, is provided to energize the cell E and to amplify the current flowing through the cell so that it may be measured by a galvanometer or analogous current measuring instrument F, connected to the output circuit of the device EA. The instrument F is adapted to indicate and may also record the varying values of the photocell current, and in some cases the instrument F may be a control instrument automatically providing corrective effect shown to be necessary by variations in the photocell current measured by the instrument.

A second filter device which may be employed with advantage in some cases, is shown as comprising an opaque disc H with a plurality of circumferentially distributed windows H' adjacent its periphery. One of said windows may be open while each of the other windows contains an optical filter body, $h'$, $h^2$, $h^3$, etc. Each of said filter bodies $h'$, $h^2$, $h^3$, etc. differs from each of the others in light absorbing capacity.

In the contemplated use of the apparatus shown diagrammatically in Fig. 1, the colors of the light selectively absorbed by the sectors $b$, $g$ and $r$ of the light absorbing filter device C, are complementary, and suitably related to the primary colors in the gray patch portion of the color negative film B undergoing analysis, so that when that film is in perfect color balance, each of the sectors $b$, $g$ and $r$ will transmit to the photocell D the same percentage of the total amount of light coming to the sector from the source A. In consequence, the total amount of light reaching the photocell is not varied as the rotation of the filter device C moves one of the sectors into, and another sector out of the path of the beam of light passing to the photocell. The rotation of the filter member C will thus produce no significant variation in the current measured by the instrument F provided that the color negative film undergoing analysis is in color balance, and provided also that the photoelectric cell D in use does not differ unduly in its response to light of different colors, as will be the case if proper care is taken in selecting a commercially available photocell for use in the apparatus.

When the color condition of the color negative film B is off-balance, the amount of light transmitted by the various filter sectors $b$, $g$ and $r$, will be different, with the result that the rotation of the filter device C will then cause significant variations in the current measured by the instrument F. The phase relation of the fluctuations in the current measured by the instrument F to the movements of the different sectors $b$, $g$ and $r$ through the beam of light passing to the photocell D, provides an indication of the relative amounts of light transmitted by the different sectors $b$, $g$ and $r$, and when those amounts are known, it is easy to determine what corrective steps should be taken to obtain optimum results in printing color positives from the color negative film undergoing analysis.

The required corrective steps can be determined more quickly and more easily by the use of the device H. In the use of the latter, when variations in the photocell current are produced as a result of the off-balance color condition of the film undergoing analysis, those variations may be interrupted by a suitable angular adjustment of the device H. The adjustment of the device then required to stabilize the photocell current is one which brings into the path of the beam of light passing to the photocell the particular filter $h'$, $h^2$, $h^3$, etc. having the filter action to compensate for the excess of light of a particular color passing to the photocell, which had caused the previous current fluctuation. The filter characteristics of the particular filter which thus makes the photocell current non-fluctuating indicate the character of the corrective filter needed to obtain optimum results in producing positive color prints from the negative color film.

The angular velocity of the filter device C is in no wise critical, provided only that it is slow enough to permit the production of visible variations in the positions of the pointer F' or analogous exhibiting element of the measuring instrument F by significant changes in the photocell current, when the different sectors $b$, $g$ and $r$ are moved successively across the path of the light beam passing to the photocell D through the gray patch portion of a color negative film in off-balance color condition. It is not essential, therefore, that the intervals during which the differently colored components of the light passing through the gray patch portion are separately eliminated, should be of equal duration or that they should follow one another in any particular sequence, or in any particular time relation.

Thus, for example, the means employed for separately eliminating differently colored light components may consist of a series of separate filters which correspond in their respective filtering actions to the filter sectors $b$, $g$, and $r$ respectively, and which are manually moved separately into and out of the path of the light passing to the photocell D. Alternatively, filter elements $ba$, $ga$ and $ra$ having filter characteristics like the sectors $b$, $g$ and $r$, may be mechanically connected and included in the device CA shown in Fig. 2, which has a handle CA' for movements by the hand of the operator to successively intercept the light beam passing to the photoelectric cell D or other light sensitive device adapted to maintain an electric current flow varying in magnitude with the intensity of the light received by the device.

As those skilled in the art will recognize, it is not essential whether the filter device C is at the side of the film portion B remote from the light source A as shown in Fig. 1, or is at the side of the portion B adjacent the source A. While the optical system shown in Fig. 1 may advantageously include a lens I for concentrating on the light sensitive device E most of the light passing through the gray patch portion B of the film and not absorbed by filter action between said portion and the light sensitive device E, the location of lens I along the axis of the optical system may be varied as conditions make desirable.

In Figs. 3 and 4, I have illustrated by way of example, a color balance indicating instrument or device including a cathode ray oscilloscope comprising a cathode ray tube J having a conventional fluorescent screen K. The tube J is mounted in a main instrument housing L provided with a window L' in front of the screen K. Equivalents for all of the apparatus elements shown diagrammatically in Fig. 1 are mounted in the housing L or in an optical head M. The latter is mounted on the housing L and may be regarded as an adjustable section of the latter. As shown, the housing L is formed beneath the head M with a horizontal seat LB for the gray patch portion or color negative film sample B to be analyzed. An adjustable lever $m$ may be provided for use in vertically adjusting the head M toward and away from the seat LB. The head M may include a lamp A and lens I like the lamps A and lens I of Fig. 1, and may also include associated parts such as a heat absorbing glass body A', and a cupric chloride cell $A^2$, having an infra red ray absorbing capacity. The body A' and cell $A^2$ may each be used in the arrangement shown in Fig. 1, as well as in the arrangement shown in Fig. 3. In the form of the invention shown in Figs. 3 and 4, the lens I is interposed between the light source A and the gray spot sample B.

As indicated in Fig. 3, the rotary filter screen C, the motor D and the photocell E are mounted in the housing L, along with yellow, magenta and cyan filter wheels, respectively designated HA, HB and HC and collectively serving the purpose of the filter unit H of Fig. 1. Each of said filter wheels supports a plurality, ordinarily four or five, of filter discs $ha$, but to simplify the illustration, each filter wheel is shown in Fig. 3 as having only two filter discs. The filter wheels HA, HB and HC are separately rotatable about a vertical axis so that each of the different filter discs may be brought into axial alignment with the optical head M. The filter wheels may be angularly adjusted manually, or automatically, as by means of intermittently operating motors.

As shown in Figs. 3 and 4, each of the filter wheels has a lower knurled peripheral portion and an inclined or bevelled upper peripheral portion which may be indexed to identify the particular filter disc $ha$ of each filter wheel in register with the optical head M in any particular angular adjustment of the filter wheel. Thus, for example, if each filter wheel has five filter discs ha, those discs may be designated on the bevelled peripheral portion of the wheel by the identifying numbers 1, 2, 3, 4 and 5, respetcively, with each identifying number so disposed as to appear in the appropriate slot in the wall portion L' when the corresponding filter disc ha is in register with the optical head M. The five filter discs of each wheel may well be arranged in a circular series about the axis of the disc in the order of their densities, which may be those indicated by the conventional symbols O, X', X², X³ and X⁴. Then if when the different filter wheels are properly adjusted to give color balance to the light transmitted to the photocell, the index numbers on the peripheral portions of the wheels HA, HB and HC respectively exposed through the slots in the inclined housing wall portion L', are the digits 1, 4 and 2, shown by way of example in Fig. 5, the exposed three digit number—142—provides an easily noted and recorded code indication of the filter correction required for the particular sample B under analysis.

The light transmitted successively through the samples and the different filter units ha of the wheels HA, HB and HC coaxial with the head M, also passes through the rotary filter C which, as shown, rotates about a vertical axis at the opposite side of the axis of the optical head M from the common axis of the filter wheels HA, HB and HC. The photocell E is mounted in the housing M in position to receive the light transmitted from the lamp in the head M through the sample, and through the filter unit of each of the wheels HA, HB and HC in register with the head M and through the rotary filter C. Preferably and as shown, the arrangement is such that the operator may readily adjust each of the filter wheels into different positions while observing the variations in the patterns formed on the cathode tubes screen K resulting from the filter wheel adjustments.

The oscilloscope J may be constructed and energized in conventional manner. Thus, as diagrammatically shown in Fig. 3, the cathode tube J comprises a cathode, a control grid, and first and second anodes respectively connected to an energizing and control unit L by terminal conductors 1, 2 and 4. The cathode ray tube J includes a pair of deflection plates connected to the unit L by conductors 5 and 6 through which a sweep or timing voltage is impressed on said deflection plates. A second pair of deflection plates are connected to the unit L by terminal conductors 7 and 8 through which a signal voltage is transmitted to the last mentioned plate. The signal voltage transmitted by the conductors 7 and 8 may be the output voltage of an amplifier N of conventional type included in the unit L, to which the photocell terminals 9 and 10 are connected. The unit L is energized through conductors 11 and 12 connected to a suitable source of current, shown as comprising conductors L' and L² adapted to supply alternating current of conventional voltage and frequency, for example, 110 volts and 60 cycles per second. The unit L will normally include a step up transformer, rectifier, voltage divider and resistors. As shown, the motor D of the apparatus shown in Fig. 3 is a synchronous motor energized through terminal conductors 13 and 14 by the supply conductors L' and L².

The motor D may be arranged to rotate the rotary filter C with any suitable frequency, for example, with a frequency of 15 cycles per second. It is practically desirable that the timing or sweep frequency, i. e., the frequency of oscillation of the voltage between the deflection plates connected to the unit L by the conductors 5 and 6 should be the same as, or a multiple of the frequency of rotation of the filter screen C. That result may be readily obtained by the inclusion in the unit L of a suitable relaxation oscillator, or other known expedient for obtaining a desired sweep voltage frequency.

To facilitate the centering of the sample B on the seat LB, a small lamp O may be mounted in the housing M in position to illuminate the sample B through the transparent sample seat LB and thus facilitate the centering of the sample gray spot. The lamp O may be energized and deenergized by manual adjustment of a switch O', and if desired, the head M may be arranged to open the circuit of the lamp O when lowered into engagement with the sample B.

Under ideal operating conditions and with perfect color balance in the light transmitted to the photocell E of Fig. 3 through the sample B, filter wheels HA, HB and HC, and rotary filter C, the pattern appearing on the screen K will be a straight line P as shown in Fig. 5, comprising sections 20, 21 and 22 above the base line X, and representing effects of light transmitted to the photocell E through the sectors b, g and r, respectively, of the rotary filter C. The line P also includes sections 23, alternating with the sections 20, 21 and 22, during which the light received by the photocell include components of light transmitted by two of the three sectors of the filter C. As those skilled in the art will understand, the sections 23 of the line P may be suppressed by opening the energizing conductor 1 for the cathode of the tube J during the periods in which light is being transmitted to the photocell simultaneously through two sectors of the filter C.

Figs. 6, 7 and 8 are diagrams differing from Fig. 5 and from one another as a result of off-color-balance of the light reaching the photocell E of Fig. 3. Thus, in Fig. 6 I have shown an oscilloscope pattern comprising a blue light component 20 which is larger, and a red light component 21 which is smaller than its green light component 22. In Fig. 7, the blue and red light components 20 and 22, respectively, of an oscilloscope pattern, are shown as approximately equal, and each greater than the green light component 21 of the pattern. In Fig. 8, the blue and red light components 20 and 22 of an oscilloscope pattern are also approximately equal, but in this case each of those components is smaller than the green light component 21 of the pattern.

As will be understood, the pattern sections 20, 21 and 22 of each of Figs. 6, 7 and 8 do not form sections of a straight line like the line P of Fig. 5 because of an off-color balance condition of the light transmitted to the photocell E which could be corrected by a suitable readjustment of one or more of the filter wheels HA, HB and HC.

In practice, as those skilled in the art will understand, in the use of the present invention the pattern ordinarily appearing on the screen K is not a straight line but a wavy line, but the portions of the line which represent the photocell illumination during the middle portions of the time intervals in which light is being transmitted through the blue, green and red sectors, respectively, of the filter screen C, will be in approximately the same positions on the fluorescent screen K as the line portions 20, 21 and 22 of Figs. 5, 6 and 7 or 8, under similar conditions in respect to color balance or unbalance.

While the present invention is of especial utility in determining what steps should be taken to compensate for color off-balance conditions due to unsuitable distribution of color forming material in photographic emulsions, or due to faulty processing of the material, the invention may be used for other purposes. In particular, it may be used with advantages in some cases to produce positive prints with color effects which differ from and are more pleasing than the color effects apparent in the actual scene reproduced in the print.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. The method of determining the color balance of photographic material which is of the monopack color type and which has had different portions separately exposed to light including blue, green and red components and similarly subjected to a non-reversal process to thereby produce a color negative on one portion and a gray patch on another portion of said material, which consists in passing a beam of light from a source of white light through the gray patch portion of said material and during each of a plurality of separate time intervals eliminating from said beam, light of such color different from the color of the light eliminated during each of the other time intervals that a mixture in the proper proportions of the light not eliminated in the different intervals will form an approximately white light, creating an electric current varying in magnitude with the non-eliminated residue of the light passing through said gray patch portion and comparing the magnitudes of the current during the different time intervals, to thereby determine the modification of the printing light needed to compensate for off-color balance of said photographic material.

2. A method as specified in claim 1, in which the elimination of light of different colors is effected by interposing light absorbing filters in the path of said beam.

3. A method as specified in claim 1, including the additional step of eliminating variations in said current created by the elimination of light of different colors by filtering out of the light passing to the light sensitive device, light of the color which by its excessive amount directly creates said variations.

4. A method as specified in claim 1, in which the magnitudes of the current during the different time intervals are visually compared by utilizing said current to deflect an electron beam impinging against different portions of a fluorescent screen during the different time intervals.

5. Apparatus for determining the color balance condition of photographic material of the monopack color type which has been exposed and processed to produce a color negative on one portion and a gray patch on another portion of the material, comprising a source of white light, a light sensitive device adapted to maintain an electric current of a magnitude varying with the intensity of light received by said device, means for supporting said material in position for the passage of light from said source through the gray patch portion of said material to said light sensitive device, light absorbing filters respectively adapted to selectively transmit blue, green and red light, power actuated means for repeatedly interposing said filters in the path of the light passing from said source through said gray patch portion to said light sensitive device during brief intervals following one another in regular succession a multiplicity of times per second, means for amplifying the resultant electric current maintained during said intervals, a cathode ray oscilloscope having a fluorescent screen, an electron beam deflecting mechanism, means for actuating said mechanism to deflect said beam in a predetermined direction with a frequency proportional to the frequency with which said intervals follow one another, a second electron beam deflecting mechanism for deflecting said beam in a direction transverse to the first mentioned direction, and means energized by said amplified current to actuate the last mentioned mechanism and thereby produce luminous lines on said screen respectively indicating the amounts of blue, green and red light transmitted during said successive intervals which are repeated with such frequency that said lines appear to be continuously visible, whereby said lines are disposed on said screen in relative positions varying in predetermined accordance with variations in the amounts of blue, green and red light transmitted in successive intervals.

6. Apparatus as specified in claim 5, including means for separately interposing in the path of the light passing to said device one or another of a series of compensating filters to thereby determine which of the last mentioned filters has the greatest eliminating effect on variations in said current resulting from the action of said light absorbing filters.

LLOYD E. VARDEN.

REFERENCES CITED

The following references are of record in the file of this patent:

UNITED STATES PATENTS

| Number | Name | Date |
|---|---|---|
| 1,798,203 | Hill | Mar. 31, 1931 |
| 2,143,145 | Farnsworth | Jan. 10, 1939 |
| 2,287,322 | Nelson | June 23, 1942 |
| 2,413,080 | Seeley | Dec. 24, 1946 |
| 2,416,918 | Goldsmith | Mar. 4, 1947 |
| 2,421,344 | Mass | May 27, 1947 |
| 2,438,303 | Simmon | Mar. 23, 1947 |
| 2,500,049 | Williams et al. | Mar. 7, 1950 |
| 2,521,954 | Tuttle et al. | Sept. 12, 1950 |

OTHER REFERENCES

Soc. of Motion Picture Engineers Journal, article by Sweet, vols. 44 and 45, June, 1945, pages 419–435.